United States Patent [19]

Balit et al.

[11] Patent Number: 5,406,646
[45] Date of Patent: Apr. 18, 1995

[54] STRETCHABLE AND WATER-RESISTANT LAMINATED FABRIC COMPOSITION AND PROCESS FOR MAKING THE SAME

[75] Inventors: Robert Balit, 12 480 Place St- Castin, Montréal, Québec, Canada, H3M 2L8; Esther Larkin, Beaconsfield, Canada

[73] Assignee: Robert Balit, Montreal, Canada

[21] Appl. No.: 134,568

[22] Filed: Oct. 8, 1993

[51] Int. Cl.⁶ .......................... A41C 3/12; A41D 7/00; B29C 35/02; B32B 1/00; B32B 7/12
[52] U.S. Cl. .......................................... 2/67; 2/243.1; 156/196; 156/228; 156/307.5; 156/331.7; 428/36.1; 428/229; 428/231; 428/236; 428/423.5
[58] Field of Search ................. 2/67, 243 A; 156/196, 156/228, 307.5, 307.6, 331.7; 428/36.1, 229, 231, 236

[56] References Cited

U.S. PATENT DOCUMENTS

| | | |
|---|---|---|
| 3,684,639 | 8/1972 | Keberle et al. |
| 4,637,851 | 1/1987 | Ueno et al. ......................... 156/272.6 |
| 4,916,755 | 4/1990 | Feigenbaum et al. ..................... 2/67 |
| 5,165,113 | 11/1992 | Hyams ..................................... 2/268 |
| 5,166,300 | 11/1992 | Rumon et al. ......................... 528/65 |

*Primary Examiner*—James C. Cannon
*Attorney, Agent, or Firm*—Kuhn and Muller

[57] ABSTRACT

The stretchable and water resistant laminated fabric composition comprises two layers of stretchable fabrics bonded together by a heat activated adhesive comprising a urethane polymer suspended in a toluene containing solvent, in a proportion of about 40% by weight of urethane polymer. Such an adhesive leaves stretchability properties of the fabrics of the layers substantially intact and provides a water resistant bond between said layers. The process for making the laminated fabric composition comprises the steps of: selecting two pieces of fabrics having given stretchability properties; coating at least one of the pieces with the adhesive; lying each coated piece in a ventilated atmosphere until the solvent in the adhesive is substantially evaporated; assembling and pressing both pieces of fabrics together for producing the laminated fabric composition; and lying the assembled laminated fabric composition in a temperate atmosphere for a predetermined period of time until the urethane polymer is substantially polymerized. The process may comprises, after the step of assembling and pressing, the additional steps of: heating the laminated fabric composition at a predetermined heating temperature; and molding the laminated fabric composition for producing a three-dimensional shaping. The fabric composition is particularly useful for making swimsuits.

17 Claims, 3 Drawing Sheets

STRETCHABLE AND WATER-RESISTANT LAMINATED FABRIC COMPOSITION AND PROCESS FOR MAKING THE SAME

BACKGROUND OF THE INVENTION

1. Field of the Invention

The invention relates to a stretchable and water resistant laminated fabric composition and a process for making such a fabric composition. This fabric composition is specially useful for making swimsuits, and more particularly a bra portion of a woman swimsuit.

2. Description of the Related Art

Conventional woman swimsuits are often provided with a bra portion having lateral gathers or similar artifices for enhancing the three-dimensional shaping effect. They are also often provided with an inner lining to ensure sufficient opacity. These characteristics however tend to flatten the breast, and the inner lining is also often uncomfortable.

Various laminating and molding processes have been proposed in the art, for providing fabrics entering in the making of woman swimsuits without inner lining. But the fabrics resulting from these processes have no elasticity or stretchability, or yet loose them rapidly over wear. Furthermore, these fabrics are generally thick and uncomfortable.

Known in the art is U.S. Pat. No. 5,165,113 (HYAMS et al.), which describes padded straps for brassieres for improving the comfort, wear, washability, the look and feel. Preferably, the fabric entering in the making of the straps has given resilience properties, as for example with nylon-lycra materials. The selected pieces of fabric are bonded and laminated together to form a moldable, integral piece. Once the laminating step is finished, the laminated piece is subjected to a molding step under pressure for shaping the laminated piece as desired. The patent alludes that the bonding of the pieces of fabric may be carried out with a toluene-based adhesive, without however giving any further indication. The snag is that such a type of adhesive may affect and particularly reduce the stretchability and elasticity properties of the fabric, which is highly undesirable for a swimsuit. Moreover, the patent does not make a single consideration regarding the use of an adhesive for leaving the stretchability properties of the fabric substantially intact, especially once the laminating step is achieved.

Also known in the art is U.S. Pat. No. 5,166,300 (RUMON et al.), which describes the use of an adhesive based on a polyurethane prepolymer suitable for bonding fabric materials. The adhesive has good resistance to high temperature, humidity and sustained UV radiation. As mentioned in the patent, the polyurethane may be used in conjunction with solvents such as toluene and ketone. However, like the previous case, the patent does not make a single consideration regarding the stretchability properties of a laminated fabric.

Also known in the art is U.S. Pat. No. 5,110,668 (MINNICK), which describes a flexible laminate involving the use of a copolyetherester resin for obtaining laminated pieces made of aromatic polyamide resin fibres. U.S. Pat. No. 4,148,322 (JACARUSO et al.) describes a laminated product suitable for making molded bra cups, which is durable, soft and strong. Also known in the art are U.S. Pat. Nos. 3,225,768 (GALITZKI et al.); 3,616,013 (BOCCHI); 3,684,639 (KEBERLE et al.); 3,867,248 (BAUER); 4,036,924 (SHISHOO et al.); 4,048,001 (REMLEY et al.); 4,109,543 (FOTI); 4,258,093 (BENEDYK); 4,287,143 (SEARS Jr.); 4,384,083 (BAKER); 4,432,364 (MARTINI); 4,435,458 (HILL); 4,637,851 (UENO et al.); 4,916,755 (FEIGENBAUM et al.); 5,154,659 (GLUCKIN); and Canadian patents nos. 692,541 (LOFTIN); 960,801 (HOWARD); and 1,195,802 (COLE et al.). These patents describe various fabric products, processes for making such products, etc., of which none attempts neither succeeds to settle the problem of leaving the stretchability properties of laminated and molded fabrics substantially intact, while being water resistant.

OBJECT OF THE INVENTION

It is therefore an object of the present invention to provide a stretchable and water resistant laminated fabric composition and a manufacturing process thereof, particularly suitable for making swimsuits, so as to overcome the aforesaid drawbacks of the prior art.

It is a subsidiary object of the present invention to provide a woman swimsuit comprising a bra portion made from such a stretchable and water resistant laminated fabric composition, which ensures sufficient opacity without an inner lining, enhances the shape of the breast portion, is water resistant, and maintains its stretchability over wear.

SUMMARY OF THE INVENTION

According to the present invention, there is provided a stretchable and water resistant laminated fabric composition comprising two layers of stretchable fabrics bonded together by a heat activated adhesive comprising a urethane polymer suspended in a toluene containing solvent, whereby said adhesive leaves stretchability properties of the fabrics of said layers substantially intact and provides a water resistant bond between said layers.

Preferably, the adhesive contains from 39 to 41% by weight of said urethane polymer.

According to the present invention, there is also provided a process for making a stretchable and water resistant laminated fabric composition comprising steps of:

a) selecting two pieces of fabrics having given stretchability properties;

b) coating at least one of said pieces with an adhesive comprising a urethane polymer suspended in a toluene containing solvent;

c) lying said at least one of said pieces in a ventilated atmosphere until the solvent in said adhesive is substantially evaporated;

d) assembling and pressing both pieces of fabrics together for producing said laminated fabric composition; and e) lying said laminated fabric composition in a temperate atmosphere for a predetermined period of time until the urethane polymer is substantially polymerized;

whereby said adhesive leaves the stretchability properties of the fabrics of said pieces substantially intact and provides a water resistant bond between said pieces.

According to an alternative embodiment of the invention, the process preferably further comprises, after said step e), the additional steps of:

heating said laminated fabric composition at a predetermined heating temperature; and molding said laminated fabric composition for producing a three-dimensional shaping.

BRIEF DESCRIPTION OF THE DRAWINGS

In order to impart full understanding of the manner in which these and other objectives are attained in accordance with the present invention, preferred embodiments thereof are described hereinafter with reference to the accompanying drawings wherein.

DETAILED DESCRIPTION OF THE DRAWINGS

Figure 1:
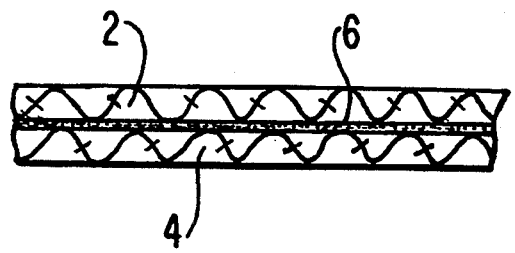
FIG. 1 is a side view of a portion of a stretchable and water resistant laminated fabric composition in accordance with the present invention.

In the following description and in the drawings, the same numerals will refer to the same or similar elements.

Referring to FIG. 1, a stretchable and water resistant laminated fabric composition according to the present invention comprises two layers 2, 4 of a stretchable fabrics bonded together by a heat activated adhesive 6 comprising a urethane polymer suspended in a toluene containing solvent, whereby the adhesive leaves stretchability properties of the fabrics of the layers 2, 4 substantially intact and provides a water resistant bond between the layers 2, 4.

Preferably but not restrictively, the adhesive contains about 40% by weight of the urethane polymer, and more particularly from 39% to 41%. It was found that the MOR-AD (registered mark) N-340 adhesive manufactured by MORTON CHEMICAL DIVISION, Chicago, Ill., has the required characteristics for manufacturing the laminated fabric composition according to the present invention.

Also preferably but not restrictively, the fabrics of the layers 2, 4 are tricots comprising about 80% of nylon and about 20% of spandex.

Figure 2:
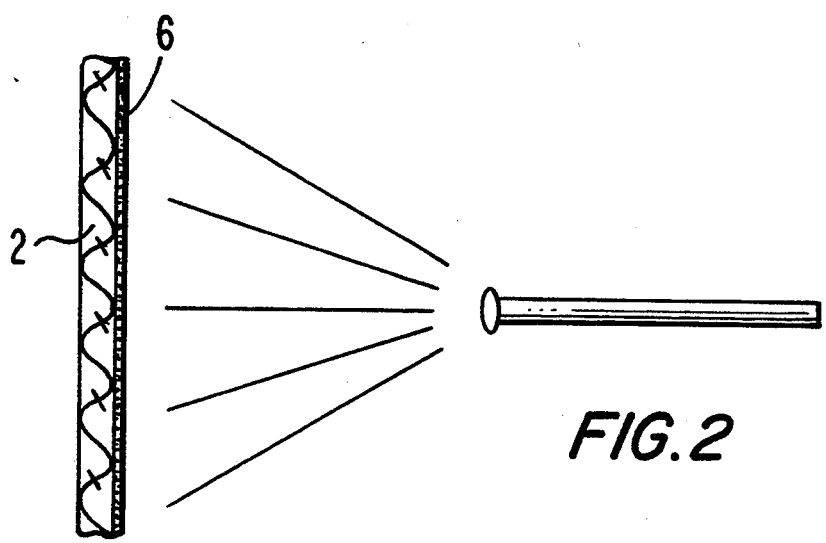
FIG. 2 is a schematic side view illustrating a step of coating a piece of fabric in accordance with the present invention.
Figure 3:
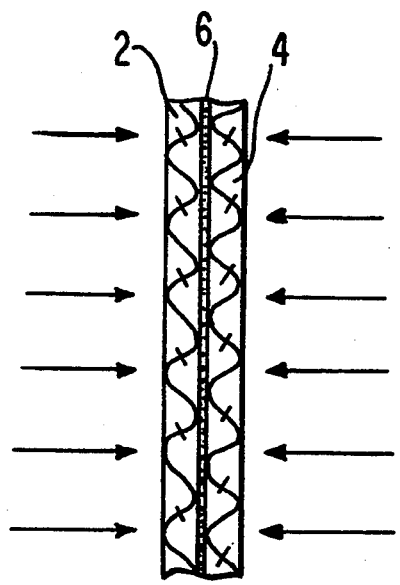
FIG. 3 is a schematic side view illustrating a step of assembling and pressing two pieces of fabrics in accordance with the present invention.
Figure 4:
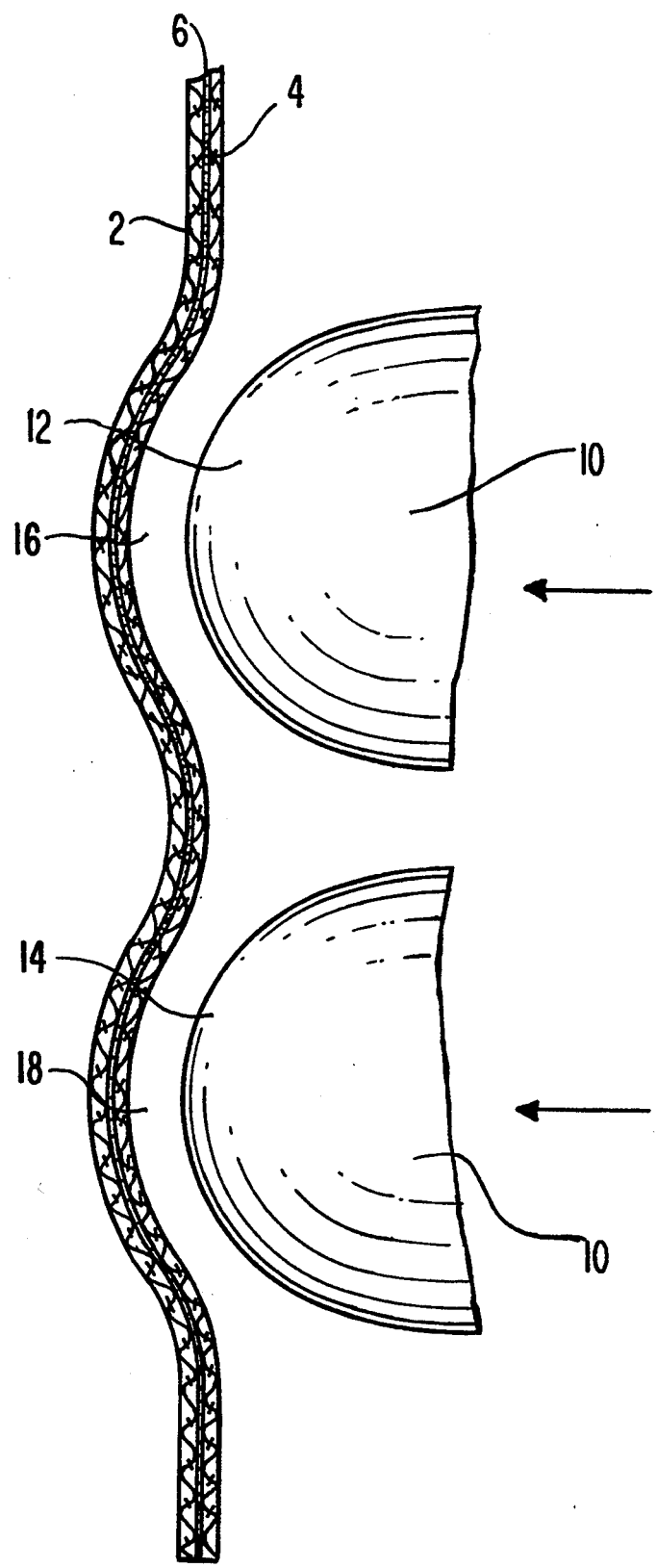
FIG. 4 is a schematic side view illustrating a step of molding a laminated fabric composition in accordance with the present invention.

Referring now to FIGS. 2, 3 and 4, the stretchable and water resistant laminated fabric composition according to the present invention is made by carrying the steps of the process described hereinafter. The first step consists of selecting two pieces 2, 4 of fabrics having given stretchability properties which suit the type of garment for which the fabric composition is intended. At least one of the pieces 2, 4 of fabrics is coated with the adhesive 6. The coating can be carried out by (gun) spraying the adhesive 6 onto the piece of fabric 2, as shown in FIG. 2. Each coated piece 2 of fabric is then laid in a ventilated atmosphere until the solvent in the adhesive 6 is substantially evaporated. Both pieces 2, 4 of fabrics are then assembled and pressed together, as shown in FIG. 3, for producing the laminated fabric composition. The laminated fabric composition is then laid in a temperate atmosphere for about twelve hours so as to let the urethane polymerized completely. As a result, the laminated fabric composition is water resistant and the stretchability properties of the fabrics of the pieces 2, 4 are left substantially intact.

The pressing step, which is shown in FIG. 3, is preferably but not restrictively carried out at a temperature of about 65° C. and at a pressure of 15 cm Hg (3 psi) for a time period determined as a function of the nature of the fabrics used.

Once the urethane is polymerized completely, the laminated fabric composition may be heated at a predetermined heating temperature, and mold for producing a three-dimensional shaping, as shown in FIG. 4.

The heating and molding steps may be carried out by applying a mechanical force with heating male pieces 10 pushed across the laminated fabric composition for a predetermined period of time within a heating chamber (not shown) at the heating temperature. The temperatures of the heating chamber and the heating male pieces 10, and the period of time are determined as a function of the nature of the fabrics used. For example, for a 80% nylon/20% spandex fabric, the temperature of the heating chamber is about 180° C., the temperature of the heating male pieces is about 205° C., and the molding time is about 20–30 seconds. The heating male pieces 10 form two protruding members 12, 14 for forming breast receiving areas 16, 18 in the laminated fabric composition, whereby the laminated fabric composition is usable as a bra portion for a women swimsuit.

Figure 5:
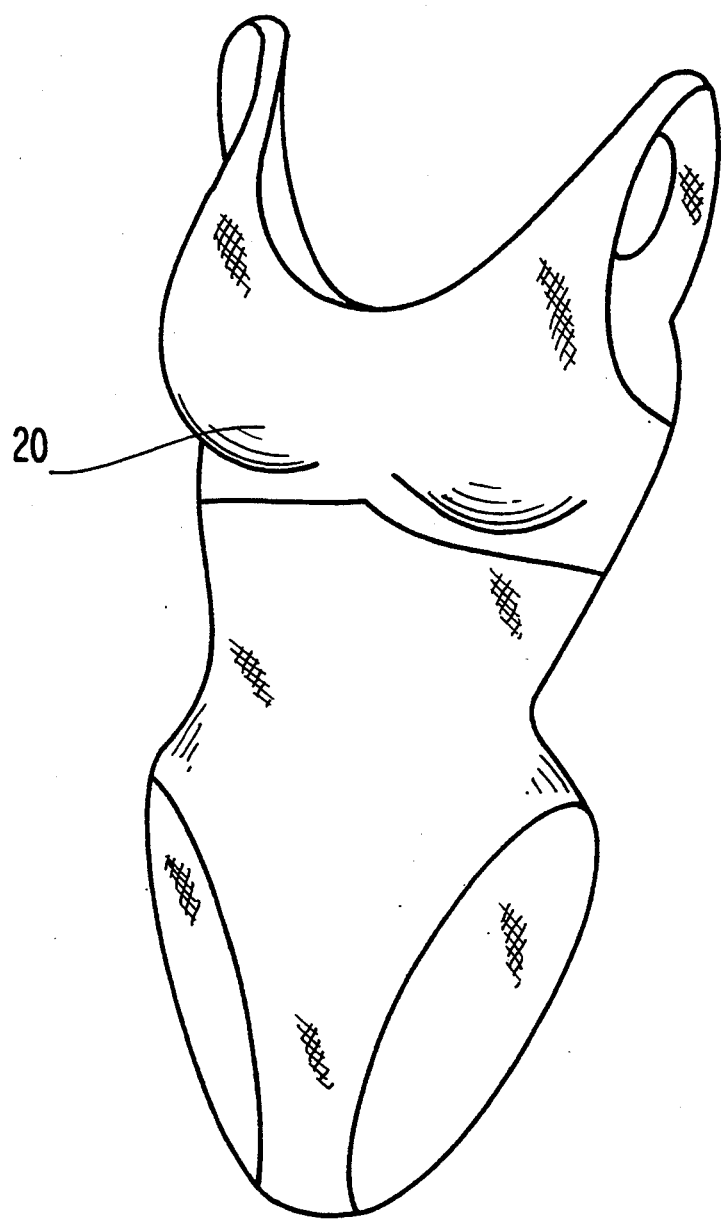
FIG. 5 is a perspective view of a woman swimsuit having a bra portion made with a fabric composition according to the present invention.

Referring to FIG. 5, there is shown such a woman swimsuit where the bra portion 20 is made from the laminated fabric composition in accordance with the present invention. By following the aforesaid process, the bra portion can be shaped to hold the breasts of the woman for natural look and gentle support without pressure, cups or wires, and no loose linings and elastic straps.

The laminated fabric composition according to the present invention can also be used to make a man swimsuit, and more particularly the male genitals-receiving portion of such a swimsuit. In this case, during the process, only one heating male piece forming a protruding member is used for forming the male genitals-receiving part.

The aforesaid temperatures and time periods should be selected with respect to the nature of the adhesive used during the assembling and pressing step so that the adhesive reacts correctly during the molding.

Although the present invention has been explained hereinafter by way of preferred embodiments thereof, it should be pointed out that any modifications to these preferred embodiments, within the scope of the appended claims, are not deemed to change or alter the nature and scope of the present invention.

What is claimed is:

1. A stretchable and water resistant laminated fabric composition comprising two layers of stretchable fabrics bonded together by a heat activated adhesive derived from a urethane polymer suspended in a toluene containing solvent, whereby said adhesive leaves stretchability properties of the fabrics of said layers substantially intact and provides a water resistant bond between said layers.

2. A fabric composition according to claim 1, wherein said adhesive initially contained about 40% by weight of said urethane polymer.

3. A fabric composition according to claim 2, wherein said adhesive initially contained from 39 to 41% by weight of said urethane polymer.

4. A fabric composition according to claim 1, wherein said fabrics are tricots comprising about 80% of nylon and about 20% of spandex.

5. A garment comprising at least some portion made from the fabric composition of claim 1.

6. A woman swimsuit comprising a bra portion made from the fabric composition of claim 1.

7. A woman swimsuit according to claim 6, wherein said bra portion includes two breast-receiving areas molded to form respectively two three-dimensional bulging shapes.

8. A process for making a stretchable and water resistant laminated fabric composition, comprising steps of:
   a) selecting two pieces of fabrics having given stretchability properties;
   b) coating at least one of said pieces with an adhesive comprising a urethane polymer suspended in a toluene containing solvent;
   c) lying said at least one of said pieces in a ventilated atmosphere until the solvent in said adhesive is substantially evaporated;
   d) assembling and pressing both pieces of fabrics together for producing said laminated fabric composition; and
   e) lying said laminated fabric composition in a temperate atmosphere for a predetermined period of time until the urethane polymer is substantially polymerized;
whereby said adhesive leaves the stretchability properties of the fabrics of said pieces substantially intact and provides a water resistant bond between said pieces.

9. A process according to claim 8, wherein said adhesive contains about 40% by weight of said urethane polymer.

10. A process according to claim 9, wherein said predetermined period of time is about twelve hours.

11. A process according to claim 9, wherein said step of coating is carried out by spraying said adhesive onto said at least one of said pieces of fabrics.

12. A process according to claim 9, wherein said step of pressing is carried out at a temperature of about 65° C. and at a pressure of about 15 cm Hg.

13. A process according to claim 8, further comprising, after said step e), the additional steps of:
   heating said laminated fabric composition at a predetermined heating temperature; and
   molding said laminated fabric composition for producing a three-dimensional shaping.

14. A process according to claim 9, further comprising, after said step e), the additional steps of:
   heating said laminated fabric composition at a predetermined heating temperature; and
   molding said laminated fabric composition for producing a three-dimensional shaping.

15. A process according to claim 14, wherein said heating and molding steps are carried out by applying a mechanical force with heating male pieces pushed across said laminated fabric composition for another predetermined period of time within a heating chamber at said heating temperature.

16. A process according to claim 15, wherein said heating male pieces form two protruding members for forming breast-receiving areas in said laminated fabric composition, whereby said laminated fabric composition is usable as a bra portion for a women swimsuit.

17. A process according to claim 15, wherein said fabrics are tricots comprising about 80% of nylon and about 20% of spandex, said predetermined period of time is about twelve hours, said step of coating is carried out by spraying said adhesive onto said at least one of said pieces of fabrics, said step of pressing is carried out at a temperature of about 65° C. and at a pressure of about 15 cm Hg, said heating temperature of the heating chamber is about 180° C., said heating male pieces have a temperature of about 205° C., and said another period of time is about 20–30 seconds.

* * * * *